June 20, 1933. H. T. BRODERSEN 1,914,906
METHOD OF COATING SHEET MATERIALS
Filed May 26, 1930
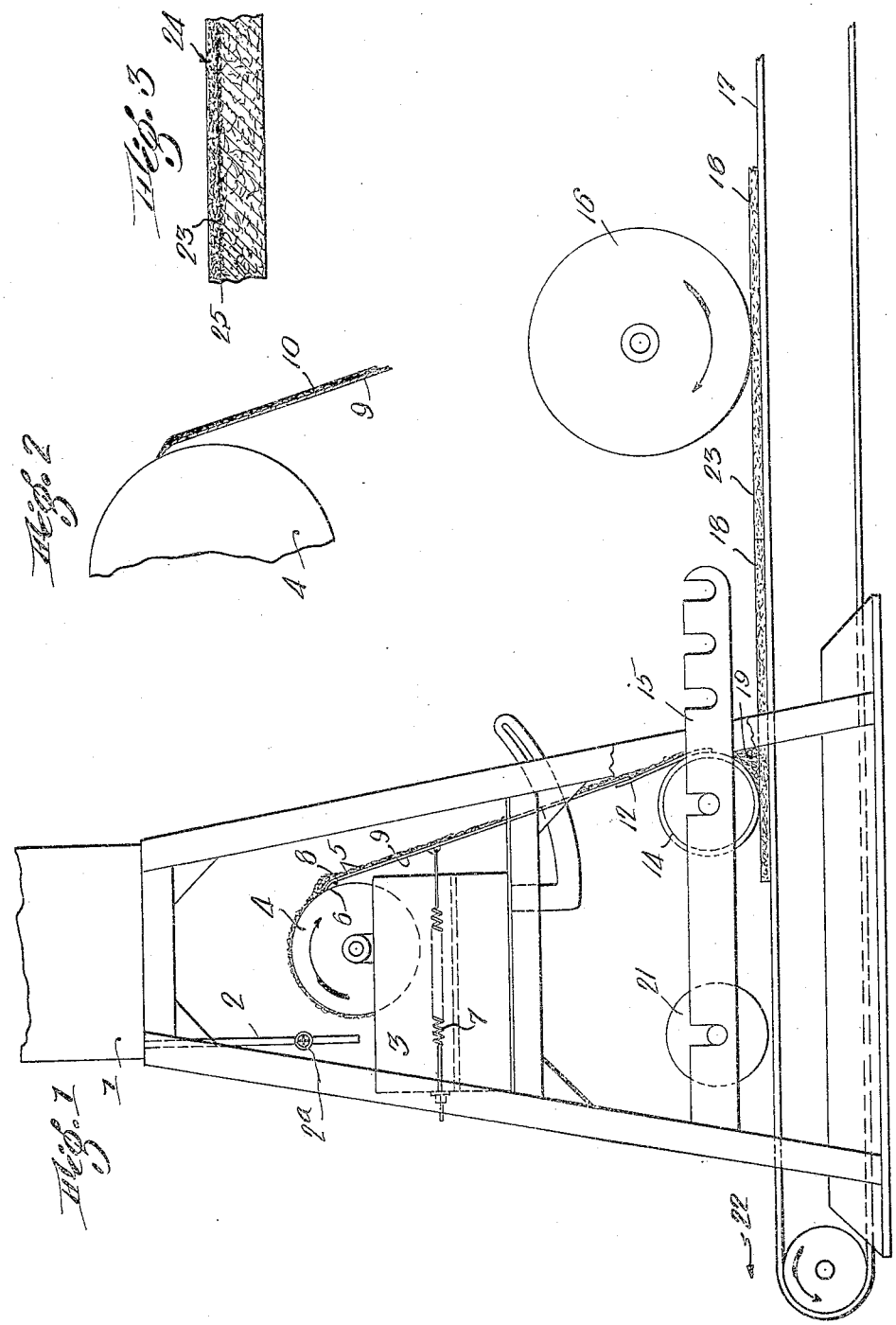

Patented June 20, 1933

1,914,906

UNITED STATES PATENT OFFICE

HARRY THEODORE BRODERSEN, OF PITTSBURG, CALIFORNIA, ASSIGNOR TO JOHNS-MANVILLE CORPORATION, OF NEW YORK, N. Y., A CORPORATION OF NEW YORK

METHOD OF COATING SHEET MATERIALS

Application filed May 26, 1930. Serial No. 455,494.

This invention relates to calcareous cementitious products or surfaces, such as shingles made of asbestos bonded with Portland cement and the like, and provides a method of coating the same for decorative or protective purposes, or both.

In the art of protecting cementitious products as heretofore practiced, it has been common to apply thereto various materials such as crushed slate or to impregnate them with liquids such as solutions of mineral salts, reactive to produce color effects, etc., or to paint or stain them in various ways. Such practices, however, have been inadequate to produce a water-repellent and weather resistant surface or one which was susceptible of acquiring and maintaining an attractive appearance, under the conditions of application and use.

An object of the present invention, therefore, is to provide a method of coating cementitious surfaces, and more particularly those characterized by containing cementitious compounds of calcium, such as Portland cement—whereby the appearance of the surface is not made unattractive but may be greatly improved and the resistance of the same to wear (during manufacture and handling) abrasion, water, ice, etc., and weather (or other atmospheric) conditions generally, as well as to aging per se, may be substantially increased. A further object is to render the treatment commercially applicable, with relatively inexpensive materials, and susceptible of combination with other treatments now employed. Further objects will appear from the following disclosure.

The procedure of the invention includes, in general, the preparation of a soluble silicate composition, (of relatively fluid consistency and preferably transparent) adjusting the concentration and viscosity (or plasticity) of the same so that it will just spread out and flow in thin films under the force of gravity, and applying the same to the surface to be treated, subjecting the applied coating to pressure and finally causing the same to dry and set. The setting of the coating layer may occur either by reaction of its components per se, or by reaction and crystalline development of the same with the cementitious surface, or both. The protective coating may, for example, be composed of an aqueous solution of sodium silicate (of appropriate specific gravity) and the viscosity may be adjusted and controlled by mixing therewith a reagent, such as a compound of an alkaline earth metal, (e. g., calcium carbonate) which is reactive with the soluble silicate to produce an insoluble silicate, such as calcium silicate. This may be supplemented or replaced by the addition of relatively inert materials (such as finely pulverized solids) which may contribute color effects and also, in part, mechanically increase the viscosity or plasticity of the ultimate composition.

A typical instance of carrying out the invention in practice will be described with respect to the coating of asbestos shingles, which are prepared from asbestos fiber mixed with Portland cement, and wet with water (before or after shaping) and then allowed to set, reference being had to the accompanying drawing, in which:

Fig. 1 is a side view, in elevation, of a part of the apparatus for making the shingles and for applying the protective composition thereto;

Fig. 2 is an enlarged detail of the feed roller and apron on the same; and

Fig. 3 is an exaggerated cross-section of a finished shingle, made in accordance with the invention.

In accordance with the invention, a coating and impregnating composition may first be prepared by mixing a commercial silicate of soda solution, preferably of a composition having a ratio of silica to sodium oxide of 3.20 minimum to 3.50 maximum and of a concentration of 42° Bé. at 60° F., as follows:

|   | Per cent |
|---|---|
| Dry color | 10 to 25 |
| Calcium carbonate | 10 to 20 |
| Water | 20 to 30 |
| 42° Bé. silicate of soda | 35 to 55 |

The calcium carbonate and dry coloring material may conveniently be mixed first with the water until a uniform suspension or slurry is obtained. The silicate solution may then be added and thoroughly mixed until all of the materials are completely dispersed or dissolved. This gives a composition in which the solids will stay in suspension for six hours or more without appreciable segregation, so that further agitation or mixing is not necessary in the course of its subsequent use.

The composition as thus prepared may be charged into a supply reservoir 1, and is substantially plastic though subject to flow under slight shearing stress, such as its own weight or when in layers of sufficient thickness, or by the application of pressure thereto. It is also sufficiently fluid, for example, to flow by gravity, as through pipe 2 controlled by valve 2a, into the lower feed tank 3, from which it may be drawn by wetting contact with a rotated feed roller 4, in the form of a substantially continuous film 5. This film is scraped from the feed roller surface by a doctor blade 6 which is held firmly against the roller by a tension spring 7 and presents a shoulder 8, followed by a sharply inclined plane or apron 9 which is preferably covered with cloth 10. It is found that the composition may be fed to and flowed over a cloth surface more uniformly and is also distributed more freely laterally than over a metal or rubber surface.

The inclined plane or apron 9 may terminate in a rubber strip 12 which either hangs freely suspended or contacts firmly against an applicator roll 14, to which it delivers the coating composition. This roller, as shown, is mounted in floating bearings 15 and may rest upon the shingles to be coated.

The shingles may be made in accordance with usual practices from a wet, dry or plastic mixture of asbestos fiber, Portland cement and water, and are conveniently conveyed, (after shaping and pressing as under roller 16) upon a horizontal travelling belt 17 which passes beneath the applicator roll 14, already described.

The shingles 18, 18, upon passing beneath the applicator roll are first contacted with and wet by the composition which accumulates in a slight mass or roll 19 in front of the roller—the entrained or adsorbed air and water therein being, to some extent at least, displaced.

As the belt continues to urge the shingle beneath the roller the composition is forced into the pores and uneven spaces of the top surface of the shingle forming intimate and penetrative contact therewith. The thickness of the coating layer and the upper surface of the same is determined by the roller 14 and may be further limited or controlled by preventing any upward movement of the same although ordinarily its own weight, when made of steel or the like, will be sufficient.

A second roll 21 similar to the first may be employed to further compress the coating material and also insure against irregularities in thickness or unevenness of the surface.

The finished, coated shingles are withdrawn at 22. They may then be piled one upon another, preferably with interleaving sheets of steel, the piles of one hundred or more shingles being then subjected to a compression of the order of twenty thousand pounds to the square inch. This expresses the water from the fibrous body of the shingle, forces the coating composition into the same, and promotes intimate contact and chemical reaction therebetween. At this stage the contacting surface 23 manifests an impenetrability to water which is attributed to the formation of a film 25 of insoluble lime silicate thereon, so that the water expressed from the pile of shingles does not pass therethrough but is substantially entirely expelled laterally from the shingle, the silicate coating 24 remaining unchanged in respect of its moisture content and distribution upon the shingle.

The upper portion of the composition coating may be still soft, but the plates may be removed and the shingles then kept in a moist atmosphere and sprayed twice a day for several days or a week, followed by several weeks of curing, without further wetting, whereupon the cementitious bond of the shingles sets and the silicate composition hardens, both by reaction with the cementitious surface of the shingle and by interaction of its several components, to form relatively stable insoluble compounds such as lime silicates. It is finally allowed to dry completely, when the shingle is finished and ready to use.

The coated shingle as thus obtained (Fig. 3) has a hard impervious surface (23 and 25) which is waterproof and weatherproof, securely attached to the cementitious body or backing of the shingle 18. It is not brittle nor readily fractured, nor is it susceptible to spalling or separating from the backing by differential expansion, mechanical shock and the like. Moreover the coloring materials contained in the substantially transparent or translucent silicate coating 24 are effective to lend their coloration to the general appearance of the shingle without being subjected to weathering, exposure to light, etc., which tends to make most coloring materials dull. At the same time the viscous fluid condition of the alkali silicate persists to some extent so as to preserve the optical continuity of the surface coating and to some extent appreciable flexibility thus permitting the penetration of nails and the like without cracking.

I claim:

1. Method of coating shaped cementitious surfaces containing soluble calcareous material, which comprises the steps of applying a viscous composition of sodium silicate thereto and compressing the same into intimate contact with said cementitious surface under heavy pressure to promote chemical reaction therebetween.

2. Method of coating shaped cementitious surfaces containing soluble calcareous material, which comprises the steps of applying a viscous composition of sodium silicate and a coloring agent thereto and compressing the same into intimate contact with said cementitious surface under heavy pressure to promote chemical reaction between the calcareous material and silicate.

3. Method of coating shaped cementitious surfaces containing soluble calcareous material, which comprises the steps of applying a viscous composition of sodium silicate and pulverized calcareous filler thereto and compressing the same into intimate contact with said cementitious surface under heavy pressure to promote chemical reaction between the calcareous material and silicate.

4. Method of coating unset hydraulic cementitious surfaces containing soluble calcareous materials, which comprises the step of applying a viscous composition of soluble silicate thereto and compressing the same into intimate contact with said cementitious surface under heavy pressure to promote chemical reaction between the calcareous material and silicate.

5. Method of coating unset hydraulic cementitious surfaces containing soluble calcareous materials, which comprises the step of applying a viscous composition of sodium silicate thereto and compressing the same into intimate contact with said cementitious surface under heavy pressure followed by causing said cementitious material to set and said calcareous material and silicate to react.

6. Method of coating hydraulic cementitious surfaces containing soluble calcareous materials, which comprises the step of applying a viscous composition of soluble silicate thereto and compressing the same into intimate contact with said cementitious surface under heavy pressure followed by causing said cementitious material to set and said calcareous material and silicate to react.

7. Method of preparing coated materials which comprises the steps of shaping a mixture of hydraulic calcareous cement, asbestos and water, applying a viscous composition of sodium silicate thereto, subjecting to heavy pressure to consolidate the same ino intimate contact, to promote chemical reaction therebetween and to expel water from the cementitious mixture, and thereafter subjecting to a moist atmosphere to set the cement.

8. Method of preparing coated materials which comprises the steps of shaping a mixture of hydraulic calcareous cement, asbestos and water, applying a viscous composition of soluble silicate thereto, subjecting to heavy pressure to consolidate the same into intimate contact, to promote chemical reaction therebetween and to expel water from the cementitious mixture, and thereafter subjecting to a moist atmosphere to set the cement.

9. A cementitious product characterized by having a coating of a solidified silicate, integrally united therewith by crystalline association.

10. A cementitious product characterized by having a coating of a solidified silicate containing insoluble particles of filler therein, integrally united by an intermediate layer of calcium silicate.

11. A cementitious product characterized by having a coating of a solidified silicate containing coloring material therein, integrally united by an intermediate layer of calcium silicate.

Signed by me at Pittsburg, California, this 13th day of May, 1930.

HARRY THEODORE BRODERSEN.